United States Patent [19]

Pengilly

[11] 4,408,004

[45] Oct. 4, 1983

[54] HIGH CLARITY, LOW HAZE POLYESTERS HAVING REDUCED INFRARED HEAT-UP TIMES

[75] Inventor: Brian W. Pengilly, Akron, Ohio

[73] Assignee: The Goodyear Tire & Rubber Company, Akron, Ohio

[21] Appl. No.: 351,841

[22] Filed: Feb. 24, 1982

[51] Int. Cl.³ .................. C08L 67/02; C08K 3/04
[52] U.S. Cl. ........................ 524/398; 524/417; 524/435; 524/496; 524/605
[58] Field of Search .......... 524/496, 605, 398, 417, 524/435

[56] References Cited

U.S. PATENT DOCUMENTS

| | | | |
|---|---|---|---|
| 3,247,159 | 4/1966 | Pendleton | 524/496 |
| 3,419,460 | 12/1968 | Ure | 524/496 |
| 3,607,818 | 9/1971 | Trubisky | 524/496 |
| 4,010,145 | 3/1977 | Russin | 528/280 |
| 4,250,078 | 2/1981 | McFarlane | 524/105 |

*Primary Examiner*—John C. Bleutge
*Assistant Examiner*—Patricia Short
*Attorney, Agent, or Firm*—Daniel J. Hudak; Bruce J. Hendricks

[57] ABSTRACT

A high clarity, low haze polyester having improved heat-up rates contains very small amounts of an infrared absorbent material therein such as carbon black. Such polyesters are used in preforms as for making trays, etc., and especially in molding operations such as in the blow molding of beverage bottles.

19 Claims, No Drawings

HIGH CLARITY, LOW HAZE POLYESTERS HAVING REDUCED INFRARED HEAT-UP TIMES

TECHNICAL FIELD

The present invention relates to polyesters with improved heat-up rate with regard to infrared light by the incorporation of carbon black therein.

BACKGROUND ART

Heretofore, various compounds and catalysts have been used in the preparation of polyesters. One such particular polyester, as set forth in pending U.S. application Ser. No. 245,838, and currently being sold, achieved such a high clarity, neutral hue and low haze value that upon the normal reheat of a parison used in the blow molding of a polyester bottle, normal molding temperatures were not obtained during the usual residence time period in a light-emitting oven. That is, the polyester was of such high clarity that it did not sufficiently absorb the infrared light emitted by the oven. The present invention therefore relates to additives which absorb a sufficient amount of light and therefore improve the heat rate and yet maintain the high clarity, neutral hue and low haze value of the polyester.

U.S. Pat. No. 4,250,078 to McFarlane et al relates to thermoplastic polyester molding compositions containing iron oxides, which compositions exhibit reduced heat-up times and are useful as in the blow molding of beverage bottles. Moreover, this patent also discloses the utilization of certain anthraquinone dyes. This patent is not pertinent in that it does not relate to a high clarity, neutral hue or low haze resin or an article made therefrom having good reheat times, and does not suggest carbon black.

U.S. Pat. No. 3,951,905 to Sano et al relates to the incorporation of antimony-containing particles. It is stated that the polyester composition has excellent transparency and slipperiness. This patent is not pertinent in that it does not state that the polyester has low haze. Moreover, the patent does not relate to improved heat-up times and uses very high amounts of the antimony particles. Further, the class of particles is entirely different from that utilized by applicant.

The following patents and articles relate to various polyesters utilizing various compounds and catalysts therein but fail to teach or suggest the compounds utilized by applicant to make a high clarity, neutral hue and low haze polyester and articles made therefrom. These patents do not relate to any specific materials or to the use to improve the heat-up time of high clarity, low haze polyesters.

U.S. Pat. No. 3,795,639 to Chimura et al relates to a process for preparing linear polyesters utilizing a germanium compound, an antimony catalyst, and a phosphoric ester.

U.S. Pat. No. 3,732,182 to Chimura et al relates to a specific type of antimony compound used in the preparation of polyesters.

U.S. Pat. No. 3,965,071 to McClelland relates to polyesters wherein deactivation of a catalyst occurs through the reaction with a phosphoric acid or ester thereof.

U.S. Pat. No 3,842,043 to Chimura et al relates to a white, transparent polyester utilizing various catalysts such as germanium, along with various solubilizing agents.

U.S. Pat. No. 4,082,724 to Hewertson relates to preparation of polyesters utilizing high amounts of phosphorus, and also antimony to prevent colored degradation.

An article of Unitika Company, Plasdoc 31808 V/17 Dewent Publications, Apr. 1, 1974, relates to a polyester made by utilizing a specified type of phosphorus-containing compound.

U.S. Pat. Nos. 3,962,189 and 4,010,145 to Russin et al and 3,907,754 to Tershansy et al relate to catalyst inhibitor systems for preparing polyesters utilizing catalysts such as titanium, phosphates, manganese, cobalt, and the like.

U.S. Pat. No. 2,641,592 to Hofrichter relates to polyester preparation utilizing cobalt acetate and antimony as catalysts.

U.S. Pat. No. 3,028,366 to Engel et al relates to phosphate modifiers in association with antimony catalysts to produce colorless or white polyesters from dimethyl terephthalate.

Chem Abstract, Volume 93, 1980, No. 93:26877m "Effect of Phosphoric Acid on the Polycondensation of Bis(2-hydroxyethyl)terephthalate Catalyzed by Antimony III Compounds" relates to the production of higher molecular weight poly(ethylene terephthalate) obtained by utilizing the phosphoric acid.

As previously noted, none of these documents relate to an improved heat-up rate utilizing a specific type of material and yet maintain an exceptionally high clarity polyester having a low haze value.

DISCLOSURE OF INVENTION

It is therefore an object of the present invention to provide a polyester which has high clarity, neutral hue and low haze values and contains very small amounts of an infrared absorbing material therein such that the polyester has improved infrared absorption.

It is yet another object of the present invention to provide a polyester having improved infrared absorption and yet high clarity, neutral hue and low haze values, as above, which has small amounts of carbon black therein and has improved heat-up rates in light-emitting ovens.

It is yet another object of the present invention to provide a polyester having improved infrared absorption and yet high clarity, neutral hue and low haze values, as above, wherein said composition is useful in molding operations such as in the blow molding of beverage bottles.

It is yet another object of the present invention to provide a polyester having improved infrared absorption and yet high clarity, neutral hue and low haze values, as above, wherein said polyester is poly(ethylene terephthalate).

It is yet another object of the present invention to provide a polyester having improved infrared absorption and yet high clarity, neutral hue and low haze values, as above, wherein said carbon black has an average particle size of from about 10 to 500 nanometers, and which is utilized in amounts of from less than 10 parts by weight per million parts by weight of polyester.

It is yet another object of the present invention to provide a polyester having improved infrared absorption and yet high clarity, neutral hue and low haze values, as above, wherein said polyester contains therein a bluing agent, an antimony catalyst, and a phosphorus compound.

It is yet another object of the present invention to provide a polyester having improved infrared absorption and yet high clarity, neutral hue and low haze values, as above, wherein said bluing agent is a cobalt compound with the elemental amount of cobalt ranging from about 5 parts to about 50 parts per million parts of polymer, wherein the amount of elemental phosphorus is from about 5 to about 60 parts per million parts by weight of said polymer, and wherein the amount of elemental antimony ranges from about 70 to about 350 parts by weight per million parts by weight of said polymer.

These and other objects of the present invention will become apparent from the following description of the invention.

Generally, a high clarity, low haze polyester, comprises: a polyester, said polyester having a small amount of an infrared absorbing material, the amount of said material being sufficiently low so that said polyester has high clarity and low haze.

BEST MODE FOR CARRYING OUT THE INVENTION

High clarity polyesters can be produced with such high clarity, that whenever subjected to a heating process involving light-emitting rays, for example infrared, the heating times are extended such that they are excessive or undesirable. For example, parisons are normally positioned on a conveyor which travel through infrared light-emitting ovens such that at the time the parisons exit from the oven for a subsequent operation, such as blow molding into a bottle, they are heated to a required temperature. Regardless of the desired end use, the present invention relates to high clarity, low haze polyesters which have improved heat-up rates through the use of various specified additives such as preferably carbon black and yet still maintain their high clarity, low haze values.

Generally, the clarity and haze condition of a polyester article is determined visually. However, the haze condition of a polyester article or resin can be quantitatively indicated by a Hunter haze test. Polyesters having low haze are generally indicated by Hunter haze number of less than 3.0, desirably less than 2.5, and preferably less than 2.0. With regard to the hue, a Hunter lab instrument is also utilized. The neutral hue with regard to polyesters of the present invention is generally indicated by an "a" coordinate value ranging from about minus 1.0 to about plus 1.0 and preferably from about minus 0.5 to about plus 1.0; and a "b" coordinate value ranging from about minus 2.0 to about 2.0, preferably from about minus 0.5 to about 2.0. Thus, essentially the film or article is neutral or colorless in hue.

With regard to the type of polyester which can be utilized, any high clarity, neutral hue polyester, copolyester, etc., in the form of a resin, powder, sheet, etc., can be utilized to which it is desired to improve the reheat time or the heat-up time of the resin. Thus, polyesters made from either the dimethylterephthalate or the terephthalic acid route or various homologues thereof as well known to those skilled in the art along with conventional catalysts in conventional amounts and utilizing conventional processes can be utilized according to the present invention. Moreover, the type of polyester can be made according to melt polymerization, solid state polymerization, and the like. Moreover, the present invention can be utilized for making high clarity, low haze powdered coatings. An example of a preferred type of high clarity polyester resin is set forth hereinbelow wherein the polyester resin is produced utilizing specific amounts of antimony catalysts, low amounts of phosphorus and a bluing agent which can be a cobalt compound.

It has been unexpectedly found that specific types of materials can be utilized to improve the heat-up rate of polyester resins utilized in light-emitting ovens and the like. A preferred material is carbon black. It was unexpected that carbon black would operate as an absorbing agent without discoloring the polyester article. That is, the article still has a neutral hue. The amount of carbon black utilized is less than 10 and generally ranges from about 0.1 to about 8.0, desirably from about 1.0 to about 5.5 and preferably from about 1.5 to about 3.5 parts by weight per million parts by weight of polyester resin. The size of the polyester particles is given by an average particle size, as listed by the manufacturer. Naturally, in any given batch, particles will exist which are larger or smaller than the listed average. Typical average particle sizes which can be utilized range from about 10 to about 500 nanometers, desirably from about 10 to about 100 nanometers, with a preferred average particle size being in a range of from about 15 to about 30 nanometers. Specific types of carbon black include channel black and furnace black.

The carbon black can be added during any stage of the polyester preparation; that is, such as at the esterification or the transesterification stage, or it can be added at the condensation stage as at the beginning thereof. Desirably, it is added at the esterification or the transesterification stage. In the case of making powdered resins, the carbon black can further be added at the compounding stage.

As noted above, the polyester is produced in a conventional manner as from the reaction of a dicarboxylic acid having from 2 to 40 carbon atoms with polyhydric alcohols such as glycols or diols containing from 2 to about 20 carbon atoms. The dicarboxylic acids can be an alkyl having from 2 to 20 carbon atoms, or an aryl, or alkyl substituted aryl containing from 8 to 16 carbon atoms. An alkyl diester having from 4 to 20 carbon atoms or an alkyl substituted aryl diester having from 10 to 20 carbon atoms can also be utilized. Desirably, the diols can contain from 2 to 8 carbon atoms and preferably is ethylene glycol. Moreover, glycol ethers having from 4 to 12 carbon atoms may also be used. Generally, most of the commonly produced polyesters are made from either dimethylene terephthalate or terephthalic acid with ethylene glycol. When powdered resin coatings are made, neopentyl glycol is often used in substantial amounts.

A preferred high clarity polyester is made utilizing an antimony catalyst, a phosphorus compound, and a bluing agent, as set forth in pending U.S. application Ser. No. 245,838. The antimony catalyst utilized in such a high clarity resin can be generally any trivalent organic antimony compound known to the art. Examples of specific antimony compounds include antimony triacetate, antimony trioxide, antimony glycolate (either formed separately or during polymerization), and the like, with antimony glycolate being preferred. The antimony compound desirably is added to the condensation stage or step of the polymerization.

The high clarity polyester is also made using relatively low amounts of a phosphorus compound, for example a phosphate, and a bluing agent in comparison to the weight or amount of the antimony catalyst. The term "phosphate," as utilized in the present invention, includes various phosphate compounds known in the art as well as phosphoric acid. The bluing agents are generally cobalt compounds which may or may not initially be blue as previously discussed. The polyesters of the present invention can be made to form various articles such as films, sheets, containers, fibers, and the like. In some of these applications wherein the polyester is utilized as a container, for example, for containing carbonate beverages, it is highly desirable to maintain or to have low acetaldehyde levels to prevent discernible differences in taste. For example, the addition of levels of acetaldehyde as low as 60 parts per billion by weight have altered the tastes of carbonated cola beverages. Other food stuffs have different taste threshhold levels which can be exceeded if the acetaldehyde level is not minimized. Desirably, when a container is utilized to contain food stuffs or liquids such as beverages, the amount of acetaldehyde diffusing from the container walls (e.g., a 2 liter bottle) of an empty, freshly blown bottle is less than 3 micrograms per liter. This test is conducted by maintaining the container at 70° F. for twenty-four hours, and then testing the gaseous content therein to determine the amount by weight of acetaldehyde. Generally, it has been found that where the acetaldehyde content is less than 3 micrograms per liter of volume in a container within twenty-four hours after preparation thereof, any remaining accumulation of acetaldehyde is low and presents no discernible taste in a beverage, food stuff, or the like with longer periods of storage.

Since cobalt compounds have been shown to increase the acetaldehyde level in a container, an amount of a phosphate compound (including phosphoric acid) is utilized to suppress the catalytic activity of the cobalt compound. Generally, one part by weight of elemental cobalt requires approximately 0.35 parts by weight of elemental phosphorus. Preferably, a slight excess of the phosphorus compound is utilized to ensure suppression of the catalytic influence of the cobalt compound on acetaldehyde production. Thus, according to the present invention, from about 0.35 to about 2.5 parts by weight, desirably from about 0.4 to about 1.3 parts by weight, and preferably from about 0.4 to about 0.6 parts by weight of elemental phosphorus is used for every one part by weight of elemental cobalt. Should a greater amount be utilized, free phosphate will generally exist which will react with the antimony to produce an antimony phosphate type compound and, if sufficient amounts exist in excess of the solubility limit of such a compound, will form particles and/or nucleation of crystallinity upon formation of the polyester. This results in a hazed article.

The specific high clarity polyester, made utilizing antimony, phosphorus, and a bluing agent, as noted above, relates to a polyester or an article made therefrom which has low haze, a neutral color, and high clarity. If a bluing agent is not utilized, the resulting polymer produced would generally not have the neutral hue in that it would have an undesirable yellowish tinge or color.

Desirably, from about 70 to about 350 parts by weight per million of elemental antimony is used based upon the produced polyester with a desired range being from 70 to 250, the preferred range being from about 120 to about 210 parts per million. The amount of cobalt ranges from about 5 parts to about 50 parts by weight per million, desirably from about 5 to about 30 parts, and preferably from about 8 parts to about 20 parts per million. The amount of the phosphate compound expressed in terms of elemental phosphorus per million parts of polyester polymer ranges from about 5 to about 60 parts, desirably from about 10 to about 50 parts, and preferably from about 8 to about 20 parts by weight. Typical cobalt coloring agents include cobalt acetate tetrahydrate, cobalt aluminate, cobalt benzoate, cobalt chloride, and the like with cobalt acetate being preferred. Examples of typical phosphate compounds include any pentavalent phosphates such as phosphoric acid, trialkylphosphates, for example, trimethylphosphate, triethylphosphate, tripentylphosphate, and the like. Triaryl phosphates such as triphenyl phosphate, triaryl phosphate, and the like can also be utilized. Additionally, mono and dialkyl/aryl phosphates can be utilized. Phosphoric acid and the trialkyl phosphates are preferred.

Desirably, the phosphate and the cobalt compounds are added before the antimony addition, and preferably during the beginning of the esterification stage although they can be added at the beginning of the condensation stage. The preparation of the polyester resin can be conducted in any conventional manner utilizing a dicarboxylic acid. That is, conventional temperatures, pressures, reaction times, and the like are utilized as well known to those skilled in the art.

Polyesters containing small amounts of carbon black therein, as above noted, can be utilized in any situation wherein the reheat or the heat-up time is desired to be shortened with regard to light from heat-emitting and infrared lighting sources. Specific areas of use of the polyester include situations wherein preforms exist which then are heated to form a final product, for example, as in the use of parisons which are blow-molded to form a bottle, for example, a beverage bottle, and the like. Another use is in preformed trays, preformed cups, and the like, which are heated and drawn to form the final product. Yet another use relates to polyester yarn which is forced through a plurality of spinnerets having an infrared quench collar thereabout. Additionally, the present invention is applicable to highly transparent, clear and yet low haze powdered coatings wherein a desired transparent film or the like is desired.

The invention will be better understood by reference to the following examples.

EXAMPLES

A high clarity poly(ethylene terephthalate) resin was modified by the addition of finely divided carbon black to improve its heat-up rate during end use processing, that is to increase the heat gain of the bottled preform when subjected to quartz infrared heating during the reheat-blow (RHB) process.

The high clarity poly(ethylene terephthalate) was made in a normal manner utilizing the amounts of phosphorus, cobalt, and antimony as indicated in Table I. Also, the 2.5 parts per million of carbon black was added as a glycol dispersion with the phosphorus compound. That is, the carbon black was added by utilizing 0.75 percent by weight of a pigment dispersant, for example, polyvinylpyrrolidone (NP-K90 manufactured by General Aniline and Film Corp.) in a solution of phosphoric acid in ethylene glycol containing 27.1 percent phosphoric acid ($H_3PO_4$) by weight. The mixture was then placed in a Waring Blendor and 7.5 percent by weight of total solution weight of a DeGussa Special Black #4 channel black having an average particle size of 25 nanometers, was slowly added until a uniform dispersion was achieved. The carbon black dispersion was then ball milled for 24 hours.

The preparation of the high clarity carbon containing polyester was made in a normal manner, for example, as set forth in U.S. pat. No. 4,020,049, to Rhinehart. That is, terephthalic acid and ethylene glycol, as well as the carbon black-phosphoric acid-ethylene glycol mixture was added at the beginning of the esterification stage and esterification was conducted at a temperature of about 225° to 280° C. After sufficient reaction time, the solution was transferred to another vessel where the cobalt as well as the antimony compound and ethylene glycol makeup were added. The polycondensation reaction was carried out at a temperature of roughly about 260° to 280° C. under high vacuum and then transferred to a stage 3 vessel with continued reaction at a temperature of about 270° to 285° C. until an intrinsic viscosity of approximately 0.57 dl/g was achieved.

0.01 percent to about 5 percent by weight, can be utilized which does not impart an undesirable color or hue to the polyester.

In a similar manner, as set forth hereinabove, polyesters were prepared utilizing specific amounts of antimony, cobalt, phosphorus, and carbon black compounds as set forth in Table III. The polyesters were then subjected to a Hunter test machine to determine their haze values as well as the "a" and "b" coordinate values.

As apparent from Table III, high clarity polyesters containing substantial amounts of carbon black, that is 5 parts per million by weight of carbon black, exhibited low haze numbers and very low hue numbers. Thus, not only visually, but by the data, the bottles were determined to have high clarity, low haze, as well as a neutral hue. This was unexpected in view of the use of carbon which has a distinct staining property.

TABLE I

| RAW MATERIAL | PERCENT | STAGE | POUNDS | (gm) | Active Element | Parts Per Million | Addition Point |
|---|---|---|---|---|---|---|---|
| Terephthalic Acid (TPA) | 100 | 1 | 129.7 | — | — | — | At beginning |
| Ethylene Glycol (EG) | 100 | 1 | 54.2 | — | — | — | At beginning |
| $H_3PO_4$/Carbon Black: EG$^{(a)}$ | — | 1 | — | — | P | 45 | At beginning |
|  |  | 1 | — | 306.2 | carbon black | 2.5 | At beginning |
| $Co(C_2H_3O_2)_2 \cdot 4H_2O$: EG$^{(b)}$ | — | 2 | — | 289.5 | Co | 20 | At start of vacuum cycle |
| $Sb_2O_3$: EG$^{(c)}$ | — | 2 | — | 1156 | Sb | 190 | At start of vacuum cycle |
| Ethylene Glycol makeup | — | 2 | 12.9 | — |  |  |  |

$^{(a)}$Carbon black suspended in $H_3PO_4$:EG Solution
$^{(b)}$Cobalt as $Co(C_2H_3O_2)_2 \cdot 4H_2O$ dissolved in ethylene glycol
$^{(c)}$$Sb_2O_3$ reacted with EG to yield Sb glycolate After the third stage, the polyester was pelletized. The pellets were then transferred to a solid state polymerization vessel and polymerized in a manner well known to the art, that is, first crystallized at approximately atmospheric pressure at a temperature of approximately 150° C. and then polymerized under about 1.0 millimeters of mercury or less at a temperature of approximately 240° C. until an intrinsic viscosity of about 0.72 was achieved. The polyester was then made into a preform such as a parison in a conventional manner. The parison was added to a quartz infrared heated oven and heated for 80 seconds. In a similar manner, compounds having different amounts of carbon black were prepared, including a high clarity control which had no carbon black therein at all. The heat-up temperatures are set forth in Table II. Additionally, a conventional polyester was also utilized as a control, but which polyester was not considered a high clarity polyester. This polyester was Cleartuf 7202, made by Goodyear, and is a polyester commonly used for making bottles.

As apparent from Table II, a heretofore conventional non-high clarity polyester during an 80 second heat-up time achieved a temperature of about 210.5° F. In contrast, a high clarity parison was only heated to 201° F. However, as apparent from the table, small amounts of carbon black increased the temperature to the normal prior art non-high clarity parison temperature and even above it. Thus, the heat-up temperature was increased for the same time period. Stated in another way, the heat-up rate was improved.

According to the present invention, a pigment dispersant is desirable although not necessary. Generally, any pigment dispersant in any conventional amount, e.g.,

TABLE II

|  | ppm of carbon black | 80 second Heat-up Temperature |
|---|---|---|
| Control (non-high clarity) | none | 210–211° F. |
| High Clarity | none | 201° F. |
| A | 0.5 | 202° F. |
| B | 1.0 | 207° F. |
| C | 2.0 | 210° F. |
| D | 2.5 | 215° F. |

TABLE III

|  | Sb | Co | P | PPM Carbon Black | Hunter "a" | Hunter "b" | Hunter Haze |
|---|---|---|---|---|---|---|---|
| 1 | 250 | 20 | 40 | 5 | −0.2 | 1.7 | 3.0 |
| 2 | 190 | 20 | 40 | 5 | −0.1 | 1.3 | 2.4 |

While having described the best mode as well as the preferred embodiments of the present invention, in accordance with the patent statutes, it is noted that the invention is not limited thereto, the scope of the invention being measured by the attached claims.

What is claimed is:

1. A high clarity, low haze polyester comprising:
  a polyester, said polyester having a small amount of an infrared absorbing material wherein said infrared absorbing material is carbon black, wherein the amount of said carbon black is present from 0.1 to 10 parts by weight per million parts by weight of said polyester, wherein said carbon black has an average particle size of from 10 to 500 nanometers and wherein said polyester has a Hunter "a" coordinate value of from minus 1 to 1 and a Hunter coordinate "b" value of from minus 2 to 2.0 and a Hunter haze value of less than 3.0

2. A high clarity, low haze polyester, according to claim 1, wherein said polyester is made by the reaction of a dicarboxylic acid having from 2 to 40 carbon atoms, or an ester thereof, with a diol having from 2 to 20 carbon atoms.

3. A high clarity, low haze polyester, according to claim 2, wherein the amount of carbon black ranges from about 1.5 to about 3.5 parts by weight, and wherein said carbon black average particle size ranges from about 15 to about 30 nanometers, and wherein said Hunter "a" coordinate value is from about minus 0.5 to 1.0 and wherein said Hunter "b" coordinate value is from about minus 0.5 to about 2.0.

4. A high clarity, low haze polyester, according to claim 3, wherein said polyester is poly(ethylene terephthalate).

5. A high clarity, low haze polyester, according to claim 4, wherein said polyester is in the shape of a preformed article.

6. A high clarity, low haze polyester, according to claim 2, 3, 4, or 5, wherein said polyester has improved infrared heat-up times.

7. A high clarity, low haze polyester, according to claim 2, 3, or 4 wherein said polyester is in the form of a high clarity article.

8. A high clarity, low haze polyester, according to claim 7, wherein said high clarity article is a beverage bottle.

9. A high clarity, low haze polyester, according to claim 4, wherein said polyester contains from about 70 to about 350 parts by weight of an elemental antimony in the form of an antimony compound per one million parts of said polyester, a low amount by weight of a phosphorus compound, and a bluing agent containing an elemental metal, the amount of elemental phosphorus in said phosphorus compound ranging from about 0.35 to about 2.5 parts by weight for each part by weight of elemental metal in said bluing agent, and wherein the amount of said elemental phosphorus in said phosphorus compound ranges from about 5 to about 60 parts by weight per million parts by weight of said polyester.

10. A high clarity, low haze polyester, according to claim 9, wherein said bluing agent is a cobalt compound, and wherein the amount of said elemental cobalt in said compound ranges from about 5 to about 50 parts by weight per million parts by weight of said polyester, and wherein said phosphorus compound is a phosphate.

11. A high clarity, low haze polyester, according to claim 10, wherein the amount of said elemental antimony in said antimony compound ranges from about 70 parts to about 250 parts of antimony per million parts by weight of said polyester, wherein the amount of said elemental cobalt in said cobalt compound ranges from about 5 to about 30 parts by weight per million parts by weight of said polyester, wherein the amount of said elemental phosphorus in said phosphorus compound ranges from about 10 to about 50 parts by weight per million parts by weight of said polyester, and wherein the ratio of said elemental phosphorus to said elemental cobalt ranges from about 0.4 to about 1.3 parts by weight.

12. A high clarity, low haze polyester, according to claim 11, wherein said polyester is made from the reaction of a dicarboxylic acid and a polyhydric alcohol compound, said dicarboxylic acid selected from the group consisting of an alkyl dicarboxylic acid having from 2 to 40 carbon atoms, and an aryl or an alkyl substituted aryl dicarboxylic acid containing from 8 to 16 carbon atoms, and combinations thereof, and wherein said polyhydric alcohol is selected from the group consisting of glycols having from 2 to 20 carbon atoms, glycol ethers having from 4 to 12 carbon atoms, and combinations thereof.

13. A high clarity, low haze polyester, according to claim 12, wherein said cobalt compound is cobalt acetate, wherein said phosphorus compound is phosphoric acid, and wherein said antimony compound is antimony glycolate, wherein said dicarboxylic acid is terephthalic acid, and wherein said glycol is ethylene glycol, wherein the amount of said elemental antimony is from about 120 to about 210 parts per million, wherein the amount of said elemental cobalt is from about 8 to about 20 parts per million, and wherein the amount of said elemental phosphorus is from about 8 to about 20 parts per million.

14. A high clarity, low haze polyester, according to claim 9, wherein said polyester is in the form of a high clarity article.

15. A high clarity, low haze polyester, according to claim 11, wherein said polyester is in the form of a high clarity article.

16. A high clarity, low haze polyester, according to claim 13, wherein said polyester is in the form of a high clarity article.

17. A high clarity, low haze polyester, according to claim 14, wherein said high clarity container is in the form of a beverage bottle.

18. A high clarity, low haze polyester, according to claim 15, wherein said high clarity container is in the form of a beverage bottle.

19. A high clarity, low haze polyester, according to claim 16, wherein said high clarity container is in the form of a beverage bottle.

* * * * *